United States Patent
Nagano

(10) Patent No.: US 6,324,126 B1
(45) Date of Patent: Nov. 27, 2001

(54) METHOD FOR RECORDING AN AUDIO BROADCAST MULTIPLEXED WITH ACCOMPANYING PROGRAM INFORMATION

(75) Inventor: Susumu Nagano, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/294,970

(22) Filed: Apr. 20, 1999

(30) Foreign Application Priority Data

Apr. 24, 1998 (JP) .................................................. 10-114524

(51) Int. Cl.⁷ ....................................................... H04H 9/00
(52) U.S. Cl. .................................................................. 369/7
(58) Field of Search ................................... 369/7, 4, 1, 2, 369/3; 370/326, 336, 343, 345, 493, 498

(56) References Cited

U.S. PATENT DOCUMENTS

| | | | |
|---|---|---|---|
| 4,887,308 | * 12/1989 | Dutton | 455/156.1 |
| 5,561,849 | * 10/1996 | Mankovitz | 455/45 |
| 5,675,575 | * 10/1997 | Wall, Jr. et al. | 370/326 |
| 5,777,997 | * 7/1998 | Kahn et al. | 370/493 |
| 5,825,731 | * 10/1998 | Yokota | 369/48 |
| 5,862,104 | * 1/1999 | Matsumoto | 369/7 |
| 6,041,023 | * 3/2000 | Lakhansingh | 369/7 |

FOREIGN PATENT DOCUMENTS

| | | | |
|---|---|---|---|
| 63-74231 | * 4/1988 | (JP) | 369/7 |
| 8-306126 | * 11/1996 | (JP) | 369/7 |
| 95/29543 | * 11/1995 | (WO) | 369/7 |

* cited by examiner

Primary Examiner—Tan Dinh
(74) Attorney, Agent, or Firm—Lerner, David, Littenber, Krumholz & Mentlik, LLP

(57) ABSTRACT

Audio data and additional audio information multiplexed therewith and distributed are received by an integrated receiver decoder. The received audio data is separated and decoded by a received-signal processing section. The data is then sent to an external recording unit and recorded onto a recording medium. The received additional audio information is separated by the received-signal processing section. The title of a musical piece and performer information are sent to the external recording unit through a digital interface or an infrared interface, and written onto a predetermined area of the recording medium.

7 Claims, 8 Drawing Sheets

FIG. 6A

```
PES_packet( ) {
        packet_start_code_prefix                24
        stream_id                                8
        PES_packet_length                       16
        '10'                                     2
        PES_scrambling_control                   2
        PES_priority                             1
        data_alignment_indicator                 1
        copyright                                1
        original_or_copy                         1
        PTS_DTS_flags                            2
        ESCR_flag                                1
        ES_rate_flag                             1
        DSM_trick_mode_flag                      1
        additional_copy_info_flag                1
        PES_CRC_flag                             1
        PES_extention_flag                       1
        PES_header_data_length                   8
        '0010'                                   4
        PTS [32..30]                             3
        marker_bit                               1
        PTS [29..15]                            15
        marker_bit                               1
        PTS [14..0]                             15
        marker_bit                               1
        PES_packet_data_byte{
                data_identifier                  8
                for(j-0;j<Na;j++){
                        data_unit_id             8
                        data_unit_length         8
                        for(i=0;j<Na;i++){
                                data_field       8
                        }
                }
        }
}
```

FIG. 6B

| | |
|---|---|
| 0x80~0x9F | reserved |
| 0xA0 | PERFORMANCE TIME OF MUSICAL PIECE |
| 0xA1 | ELAPSED PERFORMANCE TIME OF MUSICAL PIECE |
| 0xA2 | TITLE OF MUSICAL PIECE IN JAPANESE |
| 0xA3 | PERFORMER'S NAME IN JAPANESE |
| 0xA4 | TITLE OF MUSICAL PIECE N KATAKANA AND ALPHANUMERALS |
| 0xA5 | PERFORMER'S NAME IN KATAKANA AND ALPHANUMERALS |
| 0xA6 | MULTI-PURPOSE INFORMATION IN JAPANESE |
| 0xA7~ 0xFE | reserved |
| 0xFE | stuffing |

METHOD FOR RECORDING AN AUDIO BROADCAST MULTIPLEXED WITH ACCOMPANYING PROGRAM INFORMATION

BACKGROUND OF THE INVENTION

1. Field of the Invention

The present invention relates generally to receiving recording audio data distributed by digital or analog broadcasting, and more particularly, to a method for recording the title, performer information, and other related information of a musical piece onto a recording medium when the audio data is recorded.

2. Description of the Related Art

Digital satellite broadcasting has been widely used. The digital satellite broadcasting, which employs moving picture experts group phase 2 (MPEG2) for data compression, is more immune to noise and fading and achieves higher-quality signal transfer than analog broadcasting techniques. In addition, multiple channels can be used. Programs of a number of channels dedicated to fields, such as movie channels, sports channels, news channels, and music channels, have been broadcasted.

Some music channels provide programs in which audio data is multiplexed with additional audio information. When such a program of a music channel is received, the sound of a musical piece is output from a speaker connected to a receiving unit and performer information, the title of the musical piece, elapsed performance time information are displayed on the screen of a TV receiver connected to the receiving unit.

To write the title and performer information of the musical piece being recorded, into a table of contents (TOC) of a Mini Disc (hereinafter called an MD) when the audio data of the music channel is recorded in the MD, it is necessary to write down additional audio information displayed on the screen of the TV receiver on a sheet and to manually use the input section of an MD recorder.

To start recording in synchronization with the start of a musical piece, to stop recording when the musical piece ends, and to record delimitation signals of musical pieces when a plurality of musical pieces are continuously recorded, it is required to manually start, stop, and delimitations with the use of the input section of the MD recorder while the user watches an elapsed performance time indicated on the screen of the TV receiver.

In addition, when a digital broadcasting program with which no additional audio information is transferred is recorded, if the user wants to input the name of the program as TOC information, the user needs to manually input it with the use of some character input means.

SUMMARY OF THE INVENTION

The present invention has been made in consideration of the above situations. Accordingly, it is an object of the present invention to provide a data receiving and recording method and a data receiving apparatus which allow additional audio information to be automatically recorded in a recording medium when audio data with which the additional audio information is multiplexed and distributed is received and recorded in the recording medium.

Another object of the present invention is to provide a data receiving and recording method and a data receiving apparatus which allow the start of recording in synchronization with the start of a musical piece, the stop of recording in synchronization with the end of the musical piece, and recording of the delimitation signals of the musical piece when audio data with which additional audio information is multiplexed and distributed is received and recorded in a recording medium.

Still another object of the present invention is to provide a data receiving and recording method and a data receiving apparatus which allow a program name or a channel name to be automatically recorded in a recording medium when audio data with which a broadcasting station name and the program name are multiplexed and distributed is received and recorded in the recording medium.

One of the foregoing objects is achieved in one aspect of the present invention through the provision of a data receiving and recording method for receiving a broadcasting program in which the audio data of a musical piece and additional information are multiplexed and distributed, by a receiver and for recording the received audio data into a recording medium in a recording apparatus, including the steps of: selecting a transfer path for transferring the additional information received by the receiver to the recording apparatus; recording the audio data into the recording medium; and automatically writing the additional information transferred through the selected transfer path into a predetermined area of the recording medium, simultaneously with the recording of the audio data.

One of the foregoing objects is achieved in another aspect of the present invention through the provision of a data receiving and recording method for receiving a broadcasting program in which the audio data of a musical piece and additional information are multiplexed and distributed, by a receiver and for recording the received audio data into a recording medium in a recording apparatus, including the steps of: monitoring the matching of elapsed performance time information and performance time information included in the received additional information, by the receiver; and generating a control signal which controls the recording start and the recording stop of the audio data for the recording apparatus when the elapsed performance time information matches the performance time information.

One of the foregoing objects is achieved in yet another aspect of the present invention through the provision of a data receiving apparatus for receiving a broadcasting program in which the audio data of a musical piece and additional information are multiplexed and distributed and for controlling a recording apparatus so as to record the received audio data into a recording medium, including: selecting means for selecting a transfer path for transferring the received additional information to the recording apparatus; audio-data transfer means for transferring the audio data to the recording apparatus; and additional-information transfer means for transferring the additional information received through the selected transfer path to the recording apparatus, simultaneously with the transfer of the audio data.

One of the foregoing objects is achieved in still another aspect of the present invention through the provision of a data receiving apparatus for receiving a broadcasting program in which the audio data of a musical piece and additional information are multiplexed and distributed and for controlling a recording apparatus so as to record the received audio data into a recording medium, including: monitoring means for monitoring the matching of elapsed performance time information and performance time information included in the received additional information; and generating a control signal which controls the recording start and the recording stop of the audio data for the recording apparatus when the elapsed performance time information matches the performance time information.

In a data receiving and recording method and a data receiving apparatus according to the present invention, a transfer path for transferring the additional information received by the receiver to the recording apparatus is selected; the audio data is recorded into the recording medium; and the additional information transferred through the selected transfer path is automatically written into a predetermined area of the recording medium, simultaneously with the recording of the audio data.

In a data receiving and recording method and a data receiving apparatus according to the present invention, the receiver monitors the matching of elapsed performance time information and performance time information included in the received additional information and generates a control signal which controls the recording start and the recording stop of the audio data for the recording apparatus when the elapsed performance time information matches the performance time information.

BRIEF DESCRIPTION OF THE DRAWINGS

FIGS. 6A and 6B are views showing an encoding syntax for additional audio information, used in digital satellite broadcasting.

DESCRIPTION OF THE PREFERRED EMBODIMENT

Figure 1:
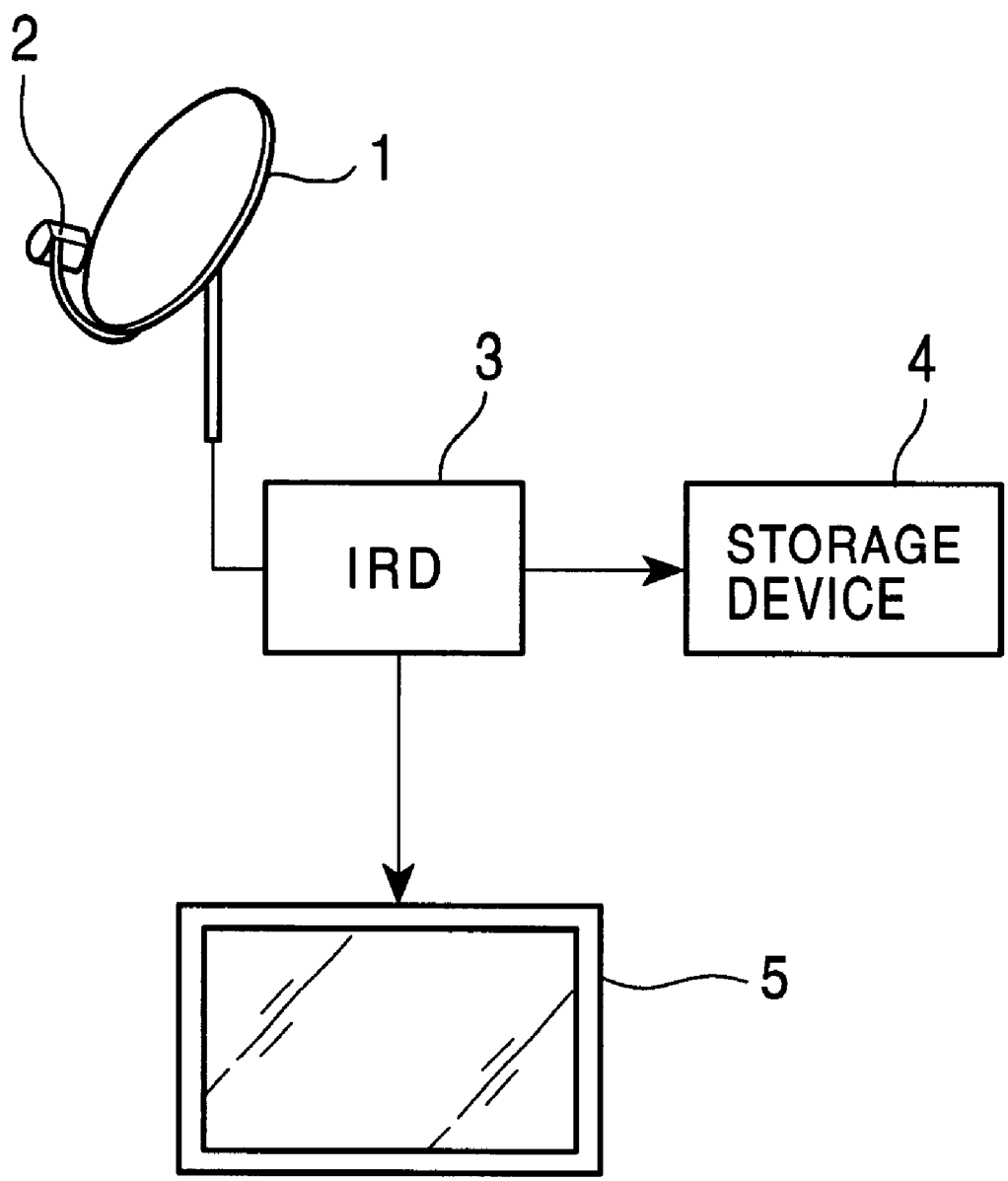
FIG. 1 is a view showing a structure of a digital-satellite-broadcasting receiving system according to the present invention.

An embodiment of the present invention will be described in detail by referring to the drawings. In digital satellite broadcasting, signals for a plurality of broadcasting programs and information are multiplexed with one broadcasting electromagnetic wave (carrier). Therefore, the following embodiment will described, assuming that such a carrier is received and demodulated to extract the target signal.

FIG. 1 is a view showing a structure of a digital-satellite-broadcasting receiving system according to the present invention. As shown in the figure, the digital-satellite-broadcasting receiving system is provided with an antenna 1, an integrated receiver decoder (IRD) 3, a storage device 4, and a TV receiver 5.

The antenna 1 receives a signal transmitted by a satellite (not shown). A converter 2 mounted on the antenna 1 converts the received signal to a signal having a predetermined frequency and sends it to the IRD 3. The IRD 3 selects the signal of a predetermined channel and demodulates video data and audio data. The IRD 3 also generates a screen for the additional audio information of the distributed audio data and an electric program guide (EPG). The output of the IRD 3 is sent to the TV receiver 5. The storage device 4 stores the received audio data. An MD recorder and a digital audio tape (DAT) recorder, for example, can be used as the storage device 4. In the following description, an MD recorder is used as the storage device 4.

Figure 2:
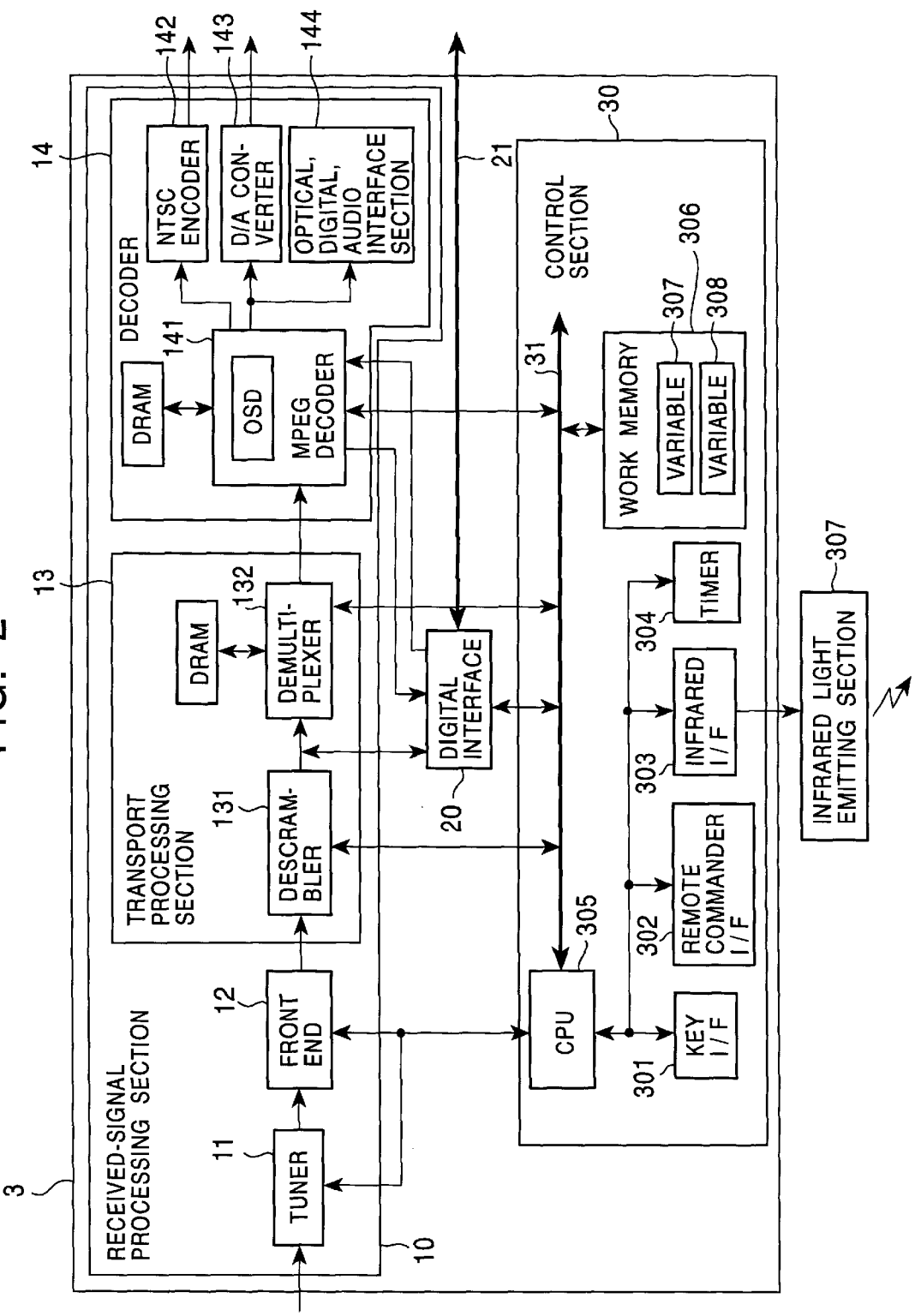
FIG. 2 is a functional block diagram of an IRD shown in FIG. 1.

FIG. 2 is a functional block diagram of the IRD 3 shown in FIG. 1. As shown in this figure, the IRD 3 is formed of a received-signal processing section 10, a digital interface section 20, and a control section 30.

The received-signal processing section 10 includes a tuner 11, a front end 12, a transport processing section 13, and a decoder 14.

The corresponding functions will be described. The tuner 11 selects one carrier among a plurality of carriers in an intermediate frequency signal obtained from the converter 2. The control section 30, described later, receives an instruction from the user of the IRD 3 through a key input interface 301 or a remote commander interface 302 and sends the corresponding control signal to the tuner 11 for carrier selection.

The front end 12 applies conversion, demodulation, and bit error correction to a signal obtained from the tuner 11 to form a digital signal.

The transport processing section 13 is formed of a descrambler 131 for decoding a scrambled signal and a demultiplexer 132 for separating the desired data stream and section data from a multiplexed transport stream. The input transport stream is once stored in a DRAM connected to the demultiplexer 132 during this separation processing.

The data streams and section data referred to are packetized elementary streams (PESs) and a section specified in ITU-T Rec H.220 and ISO/IEC 13818-11 (hereinafter called an MPEG system), respectively.

Figure 3:
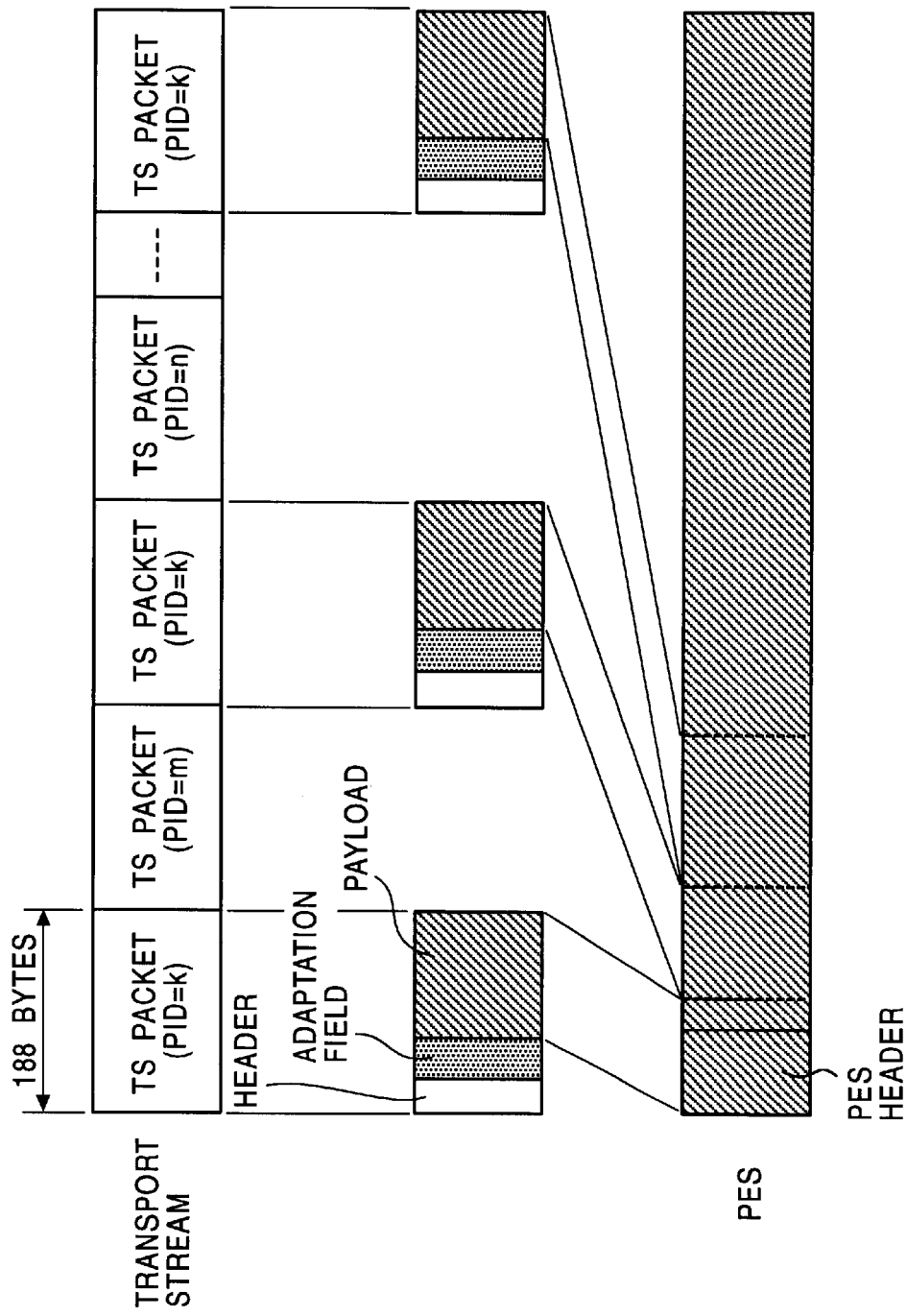
FIG. 3 is a conceptual view of a transport stream.

FIG. 3 shows a conceptual view of the transport stream. As shown in this figure, the transport stream is a collection of transport packets (hereinafter called TS packets) each having a fixed length of 188 bytes. A PES and section data are divided into a plurality of TS packets and transferred. A TS packet is formed of a header, an adaptation field, and a payload. Audio data, video data, and additional audio information are stored in a payload. A packet ID (hereinafter called PID) for identifying each stream or section is stored in a header.

Figure 4:
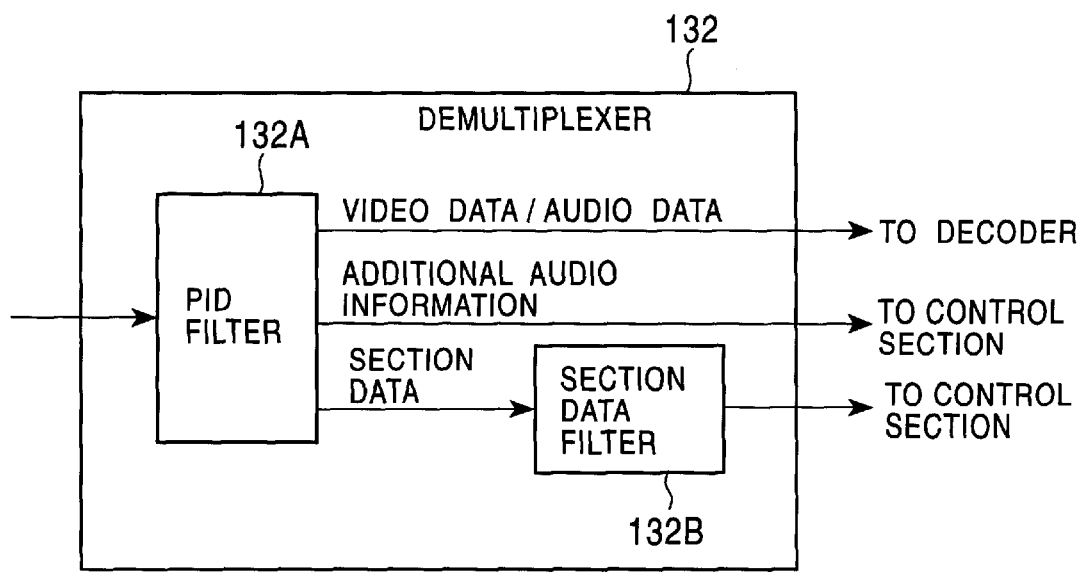
FIG. 4 is a view showing the concept of filtering in a demultiplexer shown in FIG. 1.

FIG. 4 shows a concept of filtering in the demultiplexer 132. As shown in this figure, the demultiplexer 132 is provided with a PID filter 132A and a section data filter 132B. The PID filter 132A checks the PID of an input TS packet separates video data and audio data, and send them to the decoder 14. The PID filter 132A also separates additional audio information and sends it to the control section 30. The PID filter 132A further separates section data and sends it to the section filter 132B. The section filter 132B separates the desired section data and sends it to the control section 30. In FIG. 3, the TS packets having a PID of "k" are separated and re-configured as a PES.

The decoder 14 is provided with an MPEG decoder 141, an NTSC encoder 142, a D-A converter 143, and an optical, digital, audio interface section 144. The video data sent from the demultiplexer 132 is decoded by the MPEG decoder 141, converted to a signal having an NTSC format by the NTSC encoder 142, and output, for example, to the TV receiver 5. The audio data sent from the demultiplexer is decoded by the MPEG decoder 141, and sent to the D-A converter 143 and the optical, digital, audio interface section 144. An analog audio signal obtained by digital-to-analog conversion by the D-A converter 143 is output, for example, to the TV receiver 5. The optical, digital, audio interface section 144 converts to an optical, digital, audio signal having the IEC 958 format and outputs, for example, to the MD recorder. The video data and audio data input to the MPEG decoder 141 are once stored in a DRAM connected to the MPEG decoder 141 in decoding.

The digital interface section 20 controls digital-data transfer with an external digital unit connected through an IEEE 1394 external bus 21, such as an MD recorder. Specifically, according to a control signal sent from the control section 30, the digital interface section 20 sends a command to the external digital unit through the external bus 21 as an asynchronous packet, and also sends the MPEG stream of descrambled, demultiplexed or multiplexed (before demultiplexed) video and sound as an isochronous packet. A digital audio signal decoded by the MPEG decoder 141 can be sent as an isochronous packet. The digital interface section 20 can also send video data and audio data received through the IEEE 1394 external bus 21 to the demultiplexer 132 and the MPEG decoder 141.

The control section 30 is provided with a CPU 305, a work memory 306 connected to the CPU 305 through an internal bus 31, and the key interface 301, the remote commander interface 302, an infrared interface 303, and a timer 304 all connected to the CPU 305. The CPU 305 interprets a user instruction obtained from the key interface 301 and the remote commander interface 302, and controls each section so as to respond accordingly. The infrared interface 303 is connected to an infrared light emitting section 307. The CPU 305 uses the infrared light emitting section 307 through the infrared interface 303 to output a remote control signal to control the operation of an external electronic unit, such as an MD recorder. For example, EPG information, which is transferred as section data of a transport stream, is sent from the demultiplexer 132 through the internal bus 31 and developed in the work memory 306, converted to a format specified by the user, and output to the TV receiver 5 with the use of an on-screen display (OSD) function in the MPEG decoder 141. In the following description, an interface is called an I/F.

Figure 5:
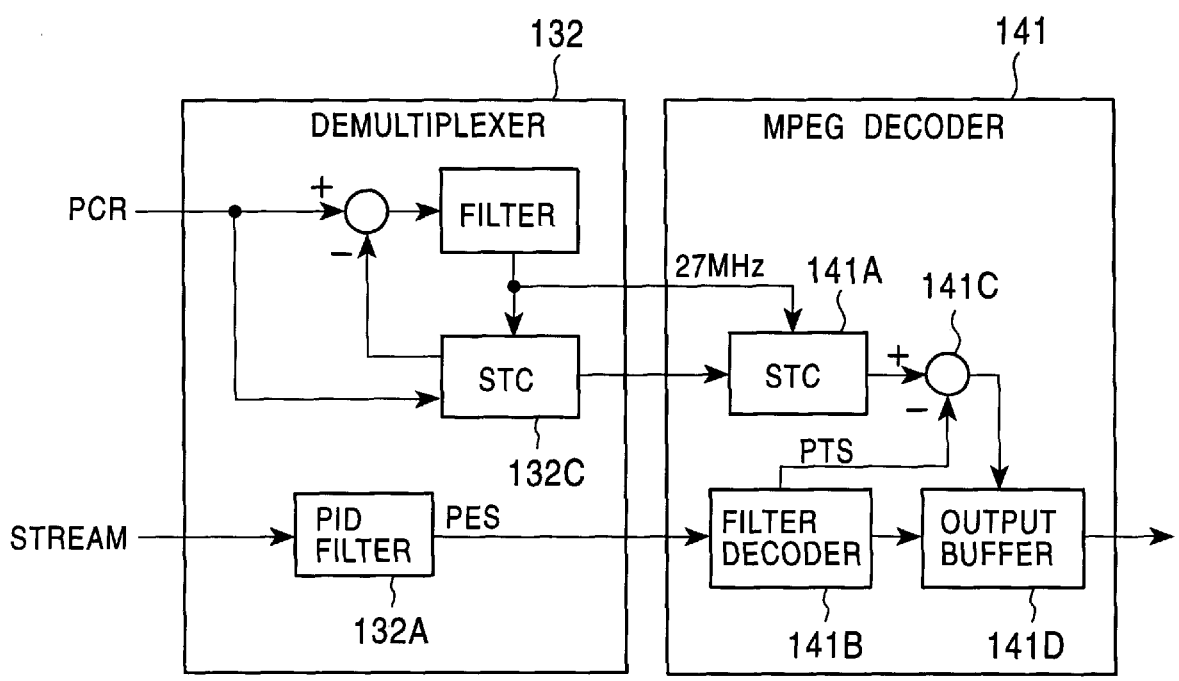
FIG. 5 is a view showing the procedure of synchronous reproduction of video data and audio data.

By referring to FIG. 5, a procedure for synchronously reproducing video data and audio data will be described next. The procedure of synchronous reproduction to be described below is specified in the MPEG system.

To synchronize a plurality of streams of video data and audio data, program clock reference (PCR) information for generating reference clock information is transferred in a TS packet. The TS packet (a TS packet having a PID) includes which includes the PCR is written in section data called a program map table (PMT). The PCR is loaded into a system time clock (STC) counter 132C in the demultiplexer 132 of the IRD 3 and an STC is generated. The STC is loaded into an STC counter 141A in the MPEG decoder 141.

The PES of the video data and audio data separated by the PID filter 132A of the demultiplexer 132 has a presentation time stamp (PTS) indicating a presentation time after decoding. In the MPEG decoder 141, a filter decoder 141B separates the PTS attached to the PES, a comparator 141C compares the PTS with the value of the STC counter 141A, and when they match, an output buffer 141D outputs the video data and audio data decoded by the filter decoder 141B.

In the present embodiment, with the use of additional audio information sent as broadcasting data, recording control of the MD recorder and TOC writing are achieved through the external bus 21 or the infrared I/F 303 in the standard IRD 3, described above. Additional audio information will be described first.

FIGS. 6A and 6B show an encoding syntax of additional audio information used in digital satellite broadcasting. In FIG. 6A, a PES packet is described according to the syntax of MPEG2, and figures indicate the numbers of bits used. FIG. 6B shows an example of data_unit_id shown in FIG. 6A.

As shown in FIGS. 6A and 6B, additional audio information is transferred in a PES packet. The transferred data includes the performance time of a musical piece, the elapsed performance time of the musical piece, the title of the musical piece in Japanese, the performer's name in Japanese, the title of the musical piece in katakana and alphanumerals, the performer's name in katakana and alphanumerals, and multi-purpose information in Japanese. The data is written according to the character system specified separately.

Main data will be described below. The performance time of a musical piece indicates the total performance time period of the musical piece currently being broadcasted. The elapsed performance time of the musical piece indicates the elapsed time period of the musical piece currently being broadcasted. Therefore, when the performance time of the musical piece matches the elapsed performance time of the musical piece, the corresponding musical piece has just finished. Since PES packets including these pieces of information are transferred at an interval of 2 to 15 seconds in operations, while the elapsed performance time of the musical piece is not being obtained, the control section 30 activates the timer 304 to interpolate the time.

The title of the musical piece in Japanese and the performer's name in Japanese indicate the title and the performer's name of the musical piece currently being broadcasted, expressed with the use of characters which include kanji characters and em-width hiragana characters. On the other hand, the title of the musical piece in katakana and alphanumerals and the performer's name in katakana and alphanumerals indicate the title and the performer's name of the musical piece currently being broadcasted, expressed with the use of en-width katakana characters and en-width alphanumeric characters.

A method for obtaining and displaying additional audio information will be described next. The CPU 305 controls the demultiplexer 132 such that the PID filter 132A filters a PES packet which stores additional audio information. When the CPU 305 receives an interrupt indicating that the target PES packet arrives, from the demultiplexer 132, the CPU 305 receives additional audio information and its PTS in the work memory 306. Next, the CPU 305 compares the received PTS with the STC in the demultiplexer 132. When they match, the CPU 305 outputs the corresponding additional audio information to the TV receiver 5 through the OSD in the MPEG decoder 141. The additional audio information is appropriately shaped. To display the elapsed performance time information of a musical piece obtained from the PES packet, it is necessary to set the elapsed time information in the variable counter 307 formed in the work memory 306 and to reset the timer 304 used for interpolation. Until the elapsed time information of another musical piece is obtained, every time the timer 304 counts one second, the variable counter 307 is incremented by one second and the value thereof is output as the elapsed performance time information.

Operations of the IRD, will be described next. Operations in the following three cases will be described: [1] when a broadcasting program in which additional audio information is multiplexed and distributed is received, if the title of a musical piece and the performer's name are automatically written into the TOC, and recording is started in synchronization with the start of a musical piece; recording is stopped when the musical piece ends; or delimitation signals of musical pieces are recorded when a plurality of musical pieces are continuously recorded, [2] when a broadcasting program in which additional audio information is not multiplexed is received, if a station name and a program name are automatically written into the TOC while a musical piece is being recorded, and [3] when a broadcasting program in which additional audio information is multiplexed and distributed is received, if the additional audio information is stored, and the title of a musical piece and the performer's name are automatically written into the TOC after recording without inputting characters.

Figure 7:
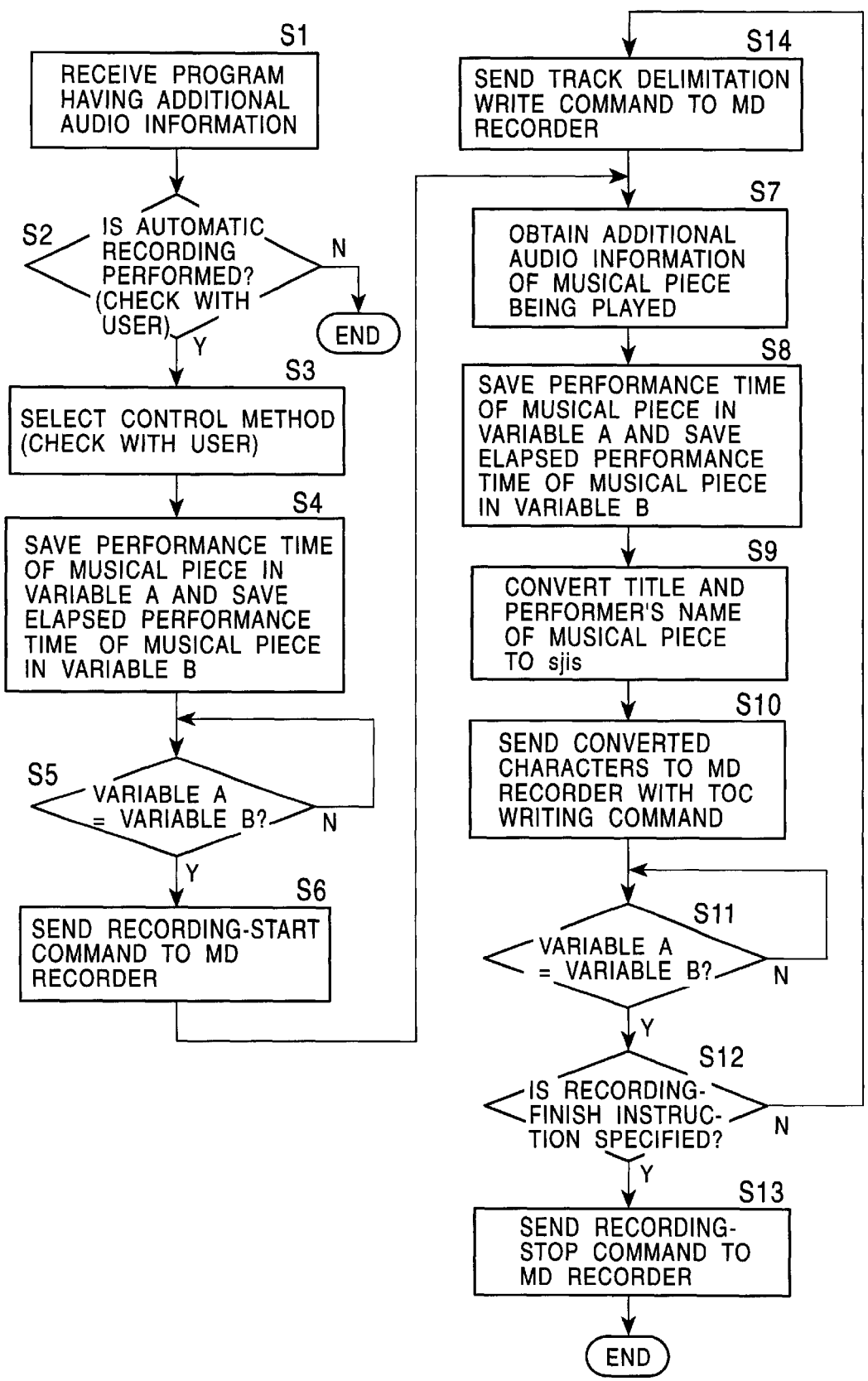
FIG. 7 is a flowchart showing an operation of the IRD performed when a broadcasting program in which additional audio information is multiplexed and distributed is received, if the title of a musical piece and the performer's name are automatically written into the TOC, and recording is started in synchronization with the start of a musical piece; recording is stopped when the musical piece ends; or delimitation signals of musical pieces are recorded when a plurality of musical pieces are continuously recorded.

FIG. 7 is a flowchart of the process in case [1], described above. In this case, it is assumed that the performance time of the musical piece currently being broadcasted is set in the variable counter 308 as a variable A, the elapsed performance time is set in the variable counter 307 as a variable B, and the variable counter 307 is interpolated as required with the use of the timer 304.

When a program having additional audio information is received (in a step S1), the control section 30 asks the user if automatic recording is desired (in a step S2). In other words, it is inquired whether TOC data is sent to an MD recorder when a musical piece is recorded and the data is automatically recorded in an MD. At the same time, the user is asked whether recording into the MD recorder is automatically started and stopped by detecting the start and the end of a musical piece, or delimitations of tracks are performed. These inquiries may be performed in advance in setting items on a menu, or may be performed on pop-up messages displayed when recording is performed.

When automatic recording is desired (the reply is YES in the step S2), the control section 30 asks the user in the same way which control method is used in recording (in a step S3). There are two control methods, one through the external bus 21 and the other through the infrared I/F 303.

When control is performed through the external bus 21, each of a recording start command, a recording stop command, a track delimitation command, and a TOC input command is sent to the MD recorder in an asynchronous packet with the use of the corresponding command in an audio/video control digital I/F command set (A/VC digital interface command set). Digital audio data is sent in the IEC 958 format to the MD recorder in an isochronous packet.

When it is found through the digital interface section 20 that a plurality of MD recorders are connected to the external bus 21, the control section 30 asks the user which MD recorder is used for recording.

When the infrared I/F 303 is used for control, an infrared command signal is sent with the use of recorder category codes for this example, MD-recorder codes. Audio data is obtained as an analog audio output sent from the D-A converter 143, or as an optical digital output obtained by converting the digital audio output decoded by the MPEG decoder 141 to the IEC 958 format.

When the user selects a control method, the CPU 305 stores the performance time of a musical piece in the variable A and the elapsed performance time of the musical piece in the variable B (step S4). When the user instructs to start recording (actually in idling, and recording has not yet started), the CPU 305 compares the variable A with the variable B and waits until they match (in a step S5). When they match, since it means that the musical piece has been just finished, a recording start command is sent to the MD recorder in the control method (through the digital I/F or the infrared I/F) instructed by the user (in a step S6) to start recording.

The additional audio information of another musical piece that has just started is written into the work memory 306 (in steps S7 and S8). The obtained title of the musical piece in katakana and alphanumerals and the obtained performer's name in katakana and alphanumerals are converted to an sjis format (in a step S9), and sent to the MD recorder with the use of a TOC writing command through the interface (digital I/F or infrared I/F) corresponding to the selected control method (in a step S10). A space character is inserted between the title of the musical piece in katakana and alphanumerals and the performer's name in katakana and alphanumerals. The transmitted data in katakana and alphanumerals is written into a TOC1 area of the MD. When the method for controlling the MD recorder through the digital I/F is selected, the title of the musical piece in Japanese and the performer's name in Japanese can be written in the MD in the same way as for the title of the musical piece in katakana and alphanumerals and the performer's name in katakana and alphanumerals. These pieces of Japanese-character data are written into a TOC4 area of the MD. When the method for controlling the MD recorder through the infrared I/F is selected, since the title of the musical piece in Japanese and the performer's name in Japanese cannot be sent, they cannot be recorded into the MD.

The CPU 305 then compares the variable A with the variable B again and waits until they match (in a step S11). When they match (the reply is YES in the step S11), since it means that the musical piece has just finished, it is determined whether the user specifies a recording-finish instruction (in a step S12). In other words, the user specifies a recording-finish instruction during recording when only one musical piece is recorded, and the user specifies a recording-finish instruction while the musical piece to be last recorded is being recorded, when a plurality of musical pieces are recorded. When the recording-finish instruction is specified (the reply is YES in the step S12), a recording-stop command is sent to the MD recorder through the digital I/F section 20 or the infrared I/F 303 (in a step S13). If a recording-finish instruction is not specified (when a plurality of musical pieces are recorded), a track-delimitation command is sent instead of a recording-stop command (in a step S14). Until a recording-finish instruction is specified (the reply is YES in the step S12), a TOC writing command and a track-delimitation command are repeatedly sent every time a musical piece starts.

In TOC data writing, it is also possible to ask the user to specify in advance that only the title of a musical piece is written, only the performer's name is written, or both are written. In FIG. 7, until a recording-finish instruction is specified, continuous recording of musical pieces is possible. It may also be possible to ask the user to specify in advance to send a recording-stop command when recording of one musical piece is finished.

Figure 8:
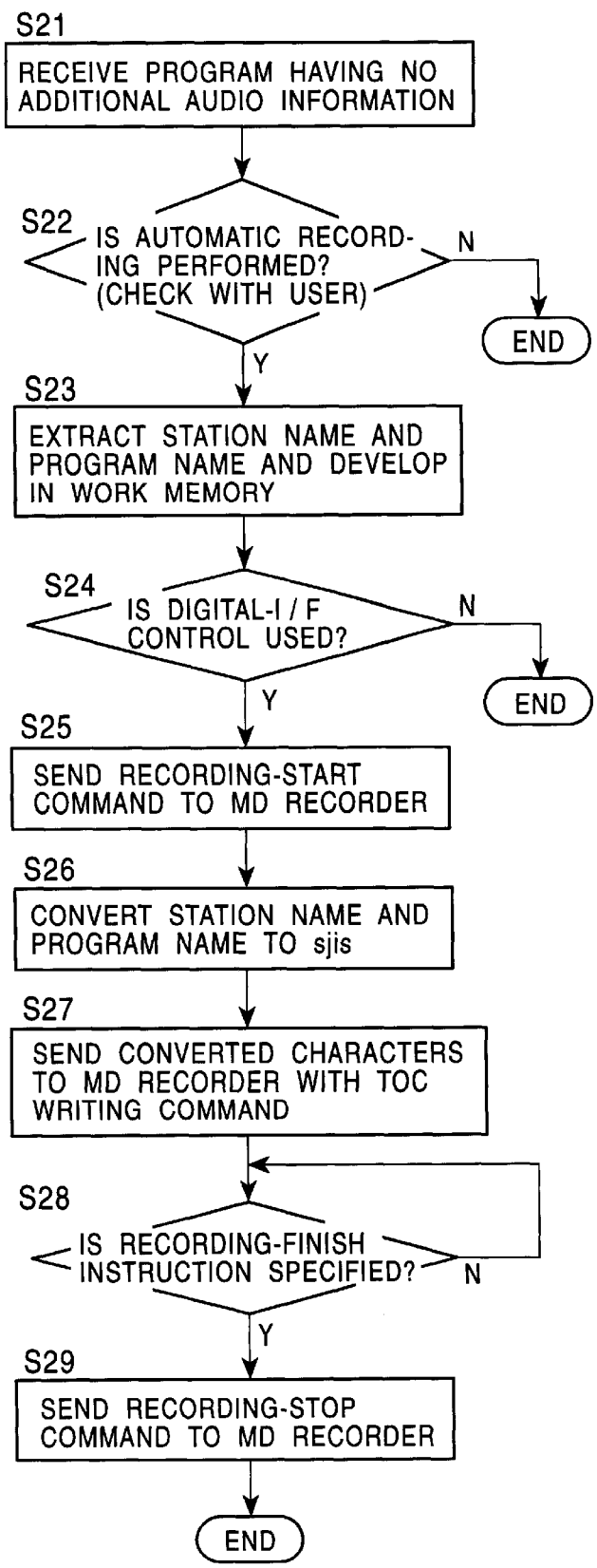
FIG. 8 is a flowchart of an operation of the IRD performed when a broadcasting program in which additional audio information is not multiplexed is received, if a station name and a program name are automatically written into the TOC while a musical piece is being recorded.

FIG. 8 is a flowchart of the process in case [2], described above.

When a program having no additional audio information is received (in a step S21), the control section 30 asks the user if automatic recording is desired (in a step S22). In other words, the user is asked whether the station name and the program name from which receiving is being performed is automatically written into the TOC of the MD.

When automatic recording is desired (the reply is YES in the step S22), the CPU 305 controls the demultiplexer 132 such that the station name and the program name from which receiving is being performed is extracted by the section data filter 132B and developed in the work memory 306 (in step S23). The station name is stored in a service description table (SDT), and the program name is stored in an event information table (EIT).

When the user specifies an instruction to the CPU 305 with the use of the remote commander (not shown) of the IRD 3 so that audio data is recorded into the MD, whether TOC writing is performed through the digital I/F section 20 is checked (in a step S24). When only the infrared-I/F control method is available, the processing is terminated. When the digital-I/F control method is available (the reply is YES in the step S24), a recording-start command is sent to the MD recorder through the digital I/F (in a step S25). The station name and the program name extracted and developed in the work memory 306 are converted to the sjis format (in a step S26), and a TOC writing command is sent to the MD recorder through the digital I/F (in a step S27). This TOC data is written into the TOC4 area of the MD. In other words, the station name and the program name are written in characters which include kanji and em-width hiragana characters in the same way as for the title of a musical piece in Japanese and the performer's name in Japanese. Therefore, when the method for controlling the MD recorder through the digital I/F is selected, the data can be sent though the digital I/F. When the infrared-I/F control method is selected, however, since the data cannot be transferred, it cannot be recorded into the MD. If the station name and the program name are transferred with the use of en-width katakana and en-width alphanumeric characters, these pieces of data can be transferred through the infrared interface and recorded into the TOC1 area of the MD.

Recording is finished when the user specifies separately (the reply is YES in a step S28), with a recording-stop command being sent to the MD recorder (in step S29).

Figure 9:
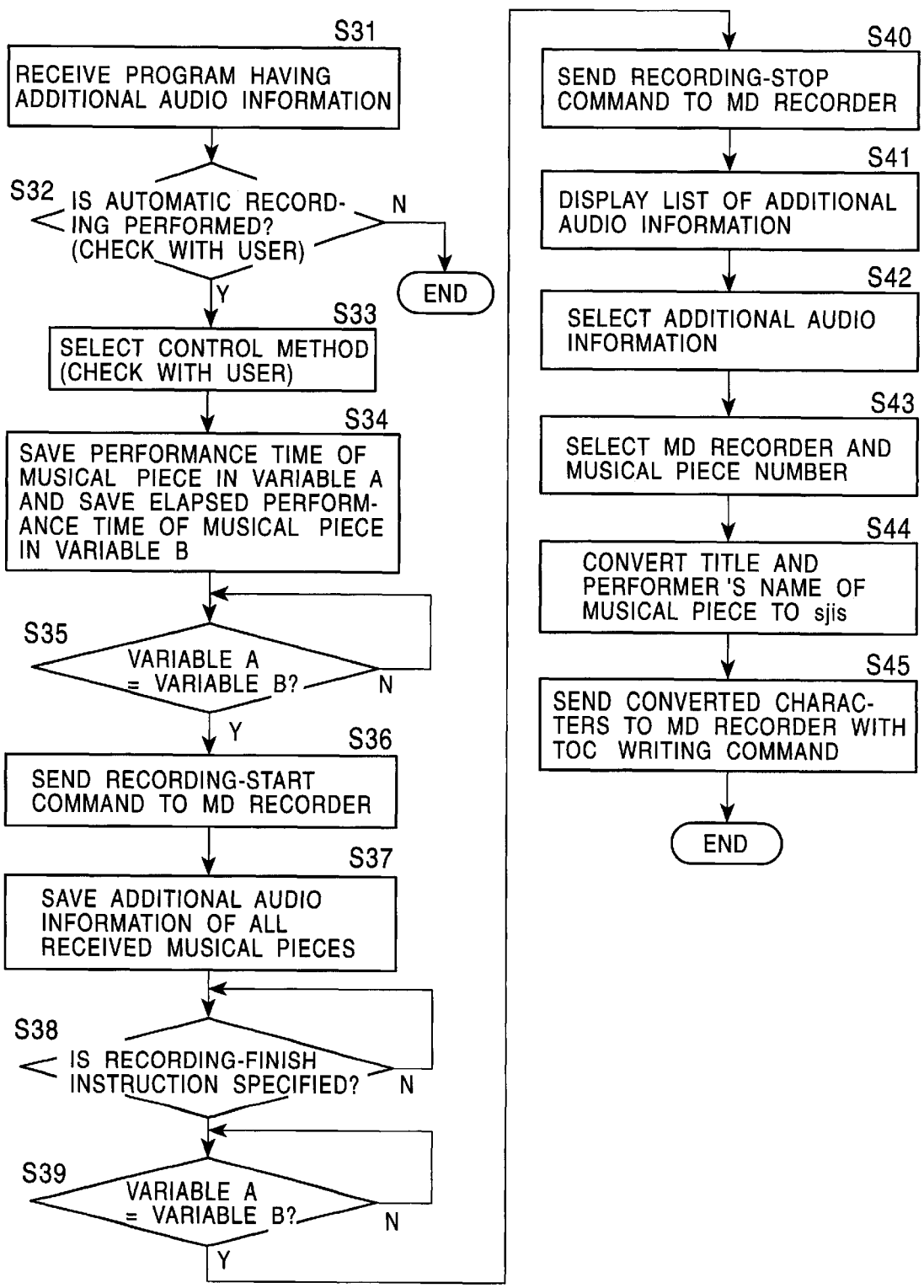
FIG. 9 is a flowchart of an operation of the IRD performed when a broadcasting program in which additional audio information is multiplexed and distributed is received, if the additional audio information is stored, and the title of a musical piece and the performer's name are automatically written into the TOC after recording, without inputting characters.

FIG. 9 is a flowchart of the process in case [3], described above. Since steps S31 to S36 are basically the same as the steps S1 to S6 in the flowchart shown in FIG. 7, descriptions thereof will be omitted to avoid repetition.

After a recording-start command is sent to the MD recorder in a step S36, the additional audio information (except the elapsed performance time) of all received musical pieces are stored in the work memory 306 (in steps S37 and S38) until the user inputs a recording-finish instruction.

When the user specifies a recording-finish instruction (the reply is YES in the step S38) and the variable A matches the variable B (the reply is YES in a step S39), a recording-stop command is sent to the MD recorder (in a step S40). The list of the additional audio information stored in the work memory 306 is displayed on the TV receiver 5 with the use of a menu and a command from the remote commander (in a step S41). The user selects one from the displayed list with the use of a key on the remote commander (in a step S42), and specifies an MD recorder to be used for recording and the transfer position in the TOC when a plurality of MD recorders are connected (in a step S43).

The CPU 305 converts the title of the musical piece in katakana and alphanumerals and the performer's name in katakana and alphanumerals, selected by the user, to the sjis format (in a step S44), and transmits to the specified MD recorder with the use of a TOC writing command (in step S45).

In FIG. 9, when the user does not select automatic recording (the reply is NO in step S32), the processing is finished. When automatic recording is not selected, it may be also possible that, with the processing not being finished, the additional audio information (except the elapsed performance time) of all received musical pieces are stored in the work memory 306 (in the same way as in the step S37), the user manually performs recording, the stored additional audio information is displayed in a list, the user selects one from the list, and the selected information is sent to the MD recorder (in the same way as in the steps S40 to S45).

In the above description, the digital satellite broadcasting receiving unit receives a program. It is not necessarily a digital satellite broadcasting program when data similar to the above-described additional audio information is multiplexed and distributed. If additional audio information is multiplexed in a vertical blanking interval in a video signal, an analog terrestrial broadcasting receiving unit can also be used. Methods other than the digital I/F method and the infrared I/F method may be used for controlling a recorder if each of recording start, recording stop, recording of delimitations on tracks, and TOC data writing is allowed.

As described above in detail, according to the present invention, with the use of additional audio information multiplexed with audio data, recording start/stop is automatically controlled in a recording apparatus, and TOC information can also be automatically written. Even if additional audio information is not multiplexed, a broadcasting station name and program information can be automatically written as TOC information. In addition, after audio data is recorded, TOC information can be easily written.

What is claimed is:

1. A data receiving and recording method, comprising:
   receiving in a receiver a broadcast program of a musical piece comprising audio data and additional information;
   selecting a transfer path for transferring the audio data and the additional information to a recording apparatus;
   recording the audio data onto a recording medium using the recording apparatus; and
   automatically recording the additional information onto a predetermined area of the recording medium simultaneously with the recording of the audio data.

2. A data receiving and recording method according to claim 1, wherein the additional information includes at least one of the title of the musical piece and performer information.

3. The data receiving and recording method according to claim 1, wherein the additional information of all received musical pieces is stored in the receiver, and after the audio data is recorded, the stored additional information is recorded.

4. The data receiving and recording method according to claim 1, wherein the transfer path includes a digital interface which transfers the audio data and the additional information to the recording apparatus.

5. A data receiving and recording method according to claim 4, wherein the additional information transferred through the digital interface is recorded in a first additional-information recording area and a second additional-information recording area of the recording medium.

6. A data receiving and recording method according to claim 1, wherein the transfer path includes an infrared interface which transfers the additional information to the recording apparatus with the use of a remote control signal.

7. A data receiving and recording method according to claim 6, wherein the additional information transferred through the infrared interface is recorded in a first additional-information recording area of the recording medium.

* * * * *

UNITED STATES PATENT AND TRADEMARK OFFICE
CERTIFICATE OF CORRECTION

PATENT NO. : 6,324,126 B1
DATED : November 27, 2001
INVENTOR(S) : Susumu Nagano

It is certified that error appears in the above-identified patent and that said Letters Patent is hereby corrected as shown below:

<u>Title page,</u>
Item [74], *Attorney, Agent or Firm*, "Littenber" should read -- Littenberg --.

<u>Column 1,</u>
Line 10, insert -- and -- before "recording"
Line 45, after "and" insert -- input the --.

<u>Column 5,</u>
Line 66, after "PID)" delete "includes".

<u>Column 7,</u>
Line 16, change "IRD," to -- IRD --.

<u>Column 8,</u>
Line 7, change "codes" to -- codes, --.

Signed and Sealed this

Second Day of July, 2002

*Attest:*

*Attesting Officer*

JAMES E. ROGAN
*Director of the United States Patent and Trademark Office*